(12) United States Patent
Meunier et al.

(10) Patent No.: US 7,017,695 B2
(45) Date of Patent: Mar. 28, 2006

(54) SNOWMOBILE SKI HAVING A SELF-STEERING KEEL ARRANGEMENT

(75) Inventors: André Meunier, Fleurimont (CA); Luc Morrissette, Racine (CA); Christian Picard, Charny (CA); Jimmy Turgeon, Rock Forest (CA)

(73) Assignee: Groupe PPD Inc., Waterville (CA)

( * ) Notice: Subject to any disclaimer, the term of this patent is extended or adjusted under 35 U.S.C. 154(b) by 0 days.

(21) Appl. No.: 10/716,597

(22) Filed: Nov. 20, 2003

(65) Prior Publication Data

US 2004/0099458 A1   May 27, 2004

Related U.S. Application Data

(60) Provisional application No. 60/431,175, filed on Nov. 21, 2002.

(51) Int. Cl.
  *B62M 27/02*  (2006.01)

(52) U.S. Cl. ............... 180/182; 180/190; 280/609; 280/21.1; 280/28

(58) Field of Classification Search ............ 180/182, 180/184, 190; 280/11.18, 15, 21.1, 22, 22.1, 280/28, 606, 608, 609

See application file for complete search history.

(56) References Cited

U.S. PATENT DOCUMENTS

| | | | |
|---|---|---|---|
| 2,404,402 A | 7/1946 | Porter | |
| 3,077,617 A | 2/1963 | Steffel | |
| 3,328,045 A | * 6/1967 | Davignon | ........... 280/21.1 |
| 3,374,003 A | 3/1968 | Fulsom | |
| 3,675,939 A | 7/1972 | Vik | |
| 3,785,448 A | * 1/1974 | Merenheimo et al. | ..... 280/21.1 |
| 3,844,367 A | 10/1974 | Flohr | |

(Continued)

*Primary Examiner*—Anne Marie Boehler
(74) *Attorney, Agent, or Firm*—Goudreau Gage Dubuc

(57) ABSTRACT

The snow ski is pivotally attached to a snowmobile in order for it to be pivotable about its longitudinal, steering and transversal axes that intersect each other. The ski has a ski sole from which integrally project first and second elongated front lateral keels and an elongated rear central keel. Moreover, rear ski sole depressions are made in the ski sole, at the vicinity of the rear keel. When the ski is in a straight-line position for allowing the snowmobile to move forward in a straight line, it adopts a flat ground-engaging position in which all three keels rest on the ground surface. When the ski is in a turn-carving position for allowing the snowmobile to move forward while turning in a desired direction, the ski is tilted sidewardly with only the central keel and a selected one of the first and second lateral keels resting on the ground, to carve the ground surface in order for the ski to exhibit a self-steering behavior with enhanced gripping effect. When the ski is in this turn-carving position, the ski sole may be prevented from engaging the ground due to the rear ground clearance of the ski sole, even though the ski may become tilted about its longitudinal, steering and transversal axes.

15 Claims, 6 Drawing Sheets

U.S. PATENT DOCUMENTS

| | | |
|---|---|---|
| 4,108,453 A | 8/1978 | Lavalier |
| 4,491,333 A * | 1/1985 | Warnke ........................ 280/28 |
| 5,443,278 A * | 8/1995 | Berto .......................... 280/28 |
| 5,868,405 A * | 2/1999 | Lavecchia et al. ....... 280/14.21 |
| 5,964,311 A * | 10/1999 | Yamamoto et al. ......... 180/190 |
| 6,105,979 A | 8/2000 | Desrochers |
| 6,276,699 B1 * | 8/2001 | Simmons et al. ............. 280/28 |
| 2001/0013687 A1 | 8/2001 | Cormican |
| 2002/0041080 A1 | 4/2002 | Moriyama et al. |
| 2002/0074752 A1 | 6/2002 | Noble |
| 2002/0185829 A1* | 12/2002 | Cormican .................. 280/21.1 |
| 2003/0024751 A1* | 2/2003 | Lebreux .................... 180/182 |
| 2003/0222419 A1* | 12/2003 | Geary ....................... 280/21.1 |

* cited by examiner

SNOWMOBILE SKI HAVING A SELF-STEERING KEEL ARRANGEMENT

CROSS-REFERENCE DATA

The present patent application claims the priority under the Paris Convention of U.S. provisional patent application No. 60/431,175 filed on Nov. 21, 2002.

FIELD OF THE INVENTION

The present invention relates to snow skis, and more particularly to a snowmobile ski having three keels suitably arranged asymmetrically on its bottom surface in order to provide the ski with enhanced steering capabilities.

BACKGROUND OF THE INVENTION

Snowmobiles are motorized vehicles destined to travel about snowy and icy ground surfaces, which can be used for leisure and transportation. A snowmobile generally comprises a main body, and a propelling mechanism used to set the snowmobile in motion, such as a driven belt track, located adjacent the rear end of the snowmobile main body. A snowmobile further comprises two front skis, located adjacent the front end of the snowmobile main body, and destined to glide on a snowy underlying ground surface. The orientation of the front snowmobile skis can be controlled by manoeuvring handlebars provided on the snowmobile and operatively connected to the skis through the instrumentality of a steering mechanism. By manoeuvring the handlebars, the orientation of the front skis can be varied, and the powered snowmobile can be steered to follow a desired path.

When a snowmobile in motion takes a turn about a snowy surface, the likelihood that the snowmobile skis loose their grip on the snowy surface exists, and so does the risk that the vehicle becomes momentarily uncontrollable. To lower the occurrence of such steering deficiencies, to increase the bite of the ski in the snow, and to enhance the overall steering efficiency of the ski, keels are provided on the bottom surface of common snowmobile skis.

When a snowmobile takes a turn at a given point on its displacement path, upon the driver appropriately manoeuvring the handlebars, the steering mechanism of the snowmobile will pivot the ski in the direction of the turn, and maintain the ski in this direction against the bias of the centrifugal acceleration of the snowmobile. At every turn, to counterbalance such centrifugal acceleration, a great deal of effort is solicited from the steering mechanism to maintain the ski in the direction of the turn. A need exists for a ski having enhanced self-steering capabilities, to help reduce the effort contributed by the steering mechanism during a turn, and to thus lessen fatiguing thereof.

SUMMARY OF THE INVENTION

The present invention relates to an elongated vehicle snow ski for use on a snow vehicle, said ski comprising:
  opposite top and bottom surfaces;
  opposite first and second sides;
  opposite front and rear ends, said ski defining a longitudinal axis extending between said front and rear ends;
  a pivot joint member attached to said top surface for pivotally attaching said ski to a snowmobile for allowing pivotal displacement of said ski about a transversal axis extending between said first and second sides and intersecting said longitudinal axis, said ski further being pivotable about a steering axis that extends transversely to and that intersects said longitudinal and transversal axes;
  a pair of spaced-apart, elongated, longitudinally-oriented lateral keels integrally projecting from said bottom surface;
  an elongated, longitudinally-oriented central keel integrally projecting from said bottom surface, said central keel being longitudinally offset relative to said lateral keels and being located between said pair of lateral keels along said transversal axis;

wherein said ski is movable between a straight line position in which a ground plane that intersects a lowermost surface of said lateral and central keels is defined, and a turn-carving position in which said ski is pivoted about its steering, longitudinal and transversal axes relative to said straight line position and is inclined laterally so that only said central keel and a single one of said pair of lateral keels intersect said ground plane and the other one of said lateral keels is raised above said ground plane, said ski bottom surface defining a ground clearance in the vicinity of said central keel allowing said ski bottom surface to remain spaced from said ground plane in said turn-carving position of said ski.

The present invention further relates to a snow vehicle destined to move over an underlying ground surface, comprising a main body, drive means carried by said main body and destined to set said snow vehicle in motion over the ground surface, a selectively controllable steering system carried by said main body comprising a steering pivot member pivotable about a steering axis, and an elongated snow ski pivotally attached to said steering axis of said steering system, said snow ski comprising:
  opposite top and bottom surfaces;
  opposite first and second sides;
  opposite front and rear ends, said ski defining a longitudinal axis extending between said front and rear ends;
  a transverse pivot joint member attached to said top surface and pivotally connected to said steering pivot member of said steering system, said transverse pivot joint member allowing pivotal displacement of said ski about a transversal axis extending between said first and second sides and extending transversely to and intersecting said longitudinal and steering axes;
  a pair of spaced-apart, elongated, longitudinally-oriented lateral keels integrally projecting from said bottom surface;
  an elongated, longitudinally-oriented central keel integrally projecting from said bottom surface, said central keel being longitudinally offset relative to said lateral keels and being located between said pair of lateral keels along said transversal axis;

wherein said ski is movable between a straight line position in which a ground plane that intersects a lowermost surface of said lateral and central keels is defined, with said steering axis forming an acute angle relative to said ground plane, and a turn-carving position in which said ski is pivoted about its steering, longitudinal and transversal axes relative to said straight line position and is inclined laterally so that only said central keel and a single one of said pair of lateral keels intersect said ground plane and the other one of said lateral keels is raised above said ground plane, said ski bottom surface defining a ground clearance in the vicinity of said central keel allowing said ski bottom surface to remain spaced from said ground plane in said turn-carving position of said ski.

In one embodiment, said lateral keels are located intermediate said transversal axis and said ski front end and said central keel is located intermediate said transversal axis and said ski rear end.

In one embodiment, said ski bottom surface is generally concave and defines a first snow channel between said pair of lateral keels, said first snow channel forking into a second snow channel between said central keel and said first side and a third snow channel between said central keel and said second side, said first, second and third snow channels being destined to channel snow therein during sliding engagement of said ski over a snow-covered terrain.

In one embodiment, said ground clearance includes depressions formed in said ski bottom surface.

In one embodiment, said ski comprises a pair of said depressions located along said ski first and second sides and longitudinally adjacent said central keel.

In one embodiment, said ski further comprises an additional depression in the form of a rearwardly upward inclination of said ski bottom surface near said ski rear end.

In one embodiment, said steering system comprises a second steering pivot member pivotable about a second steering axis in addition to the first-named said steering pivot member pivotable about the first-named steering axis, and a second elongated snow ski pivotally attached to said second steering axis in addition to said first-named snow ski being attached to said first-named steering axis, said first-named and second snow skis forming a pair of snow skis located on one side and the other of said snow vehicle and pivotally attached to said steering system for interdependent pivotal displacement of said snow-skis, said second snow ski comprising:

opposite top and bottom surfaces;

opposite first and second sides;

opposite front and rear ends, said ski defining a longitudinal axis extending between said front and rear ends;

a transverse pivot joint member attached to said top surface and pivotally connected to said second steering pivot member of said steering system, said transverse pivot joint member allowing pivotal displacement of said second snow ski about a transversal axis extending between said first and second sides and extending transversely to and intersecting said longitudinal axis and said second steering axis;

a pair of spaced-apart, elongated, longitudinally-oriented lateral keels integrally projecting from said bottom surface;

an elongated, longitudinally-oriented central keel integrally projecting from said bottom surface, said central keel being longitudinally offset relative to said lateral keels and being located between said pair of lateral keels along said transversal axis;

wherein said second snow ski is movable between a straight line position in which a ground plane that intersects a lowermost surface of said lateral and central keels is defined, and a turn-carving position in which said second snow ski is pivoted about said second snow ski steering, longitudinal and transversal axes relative to said straight line position and is inclined laterally so that only said central keel and a single one of said pair of lateral keels intersect said ground plane and the other one of said lateral keels is raised above said ground plane, said ski bottom surface defining a ground clearance in the vicinity of said central keel allowing said ski bottom surface to remain spaced from said ground plane in said turn-carving position of said ski.

In one embodiment, said first-named and second steering pivot members are inclined rearwardly upwardly from said transverse pivot joint members of said first-named ski and said second ski, respectively, towards said snow vehicle main body.

In one embodiment, said first-named and second steering pivot members are further inclined inwardly upwardly from said transverse pivot joint members of said first-named ski and said second ski, respectively, towards said snow vehicle main body.

The present invention further relates to an elongated snow ski for use on a snow vehicle and destined to glide on and carve a ground surface, said ski being able to take a straight-moving position and a turn-carving position, said ski comprising:

opposite front and rear ends;

a ski sole having two lateral edges extending between said front and rear ends;

a longitudinal axis extending between said front and rear ends and a transverse axis extending transversely across said lateral edges, perpendicularly to said longitudinal axis;

first, second and third elongated keels fixedly projecting from said ski sole, said first and second keels being in facing register with each other, and off-centered on said ski sole with respect to said transverse axis, said third keel being intermediate to said first and second keels with respect to said transversal axis, and said third keel being substantially longitudinally offset relative to said first and second keels with reference to said longitudinal axis;

a ground clearance made in said ski sole at the vicinity of said third keel;

wherein said first, second and third keels are destined to carve the ground surface when said ski is in said straight-moving position, and wherein, when said ski is driven and is set in said turn-carving position, only a selected one of said first and second keels and said third keel are destined to carve the ground surface in order for said ski to exhibit a self-steering behavior.

In one embodiment, said two said depressions are formed along said lateral edges, said depressions forming a constriction in said ski sole.

DETAILED DESCRIPTION OF THE EMBODIMENTS

Figure 1:
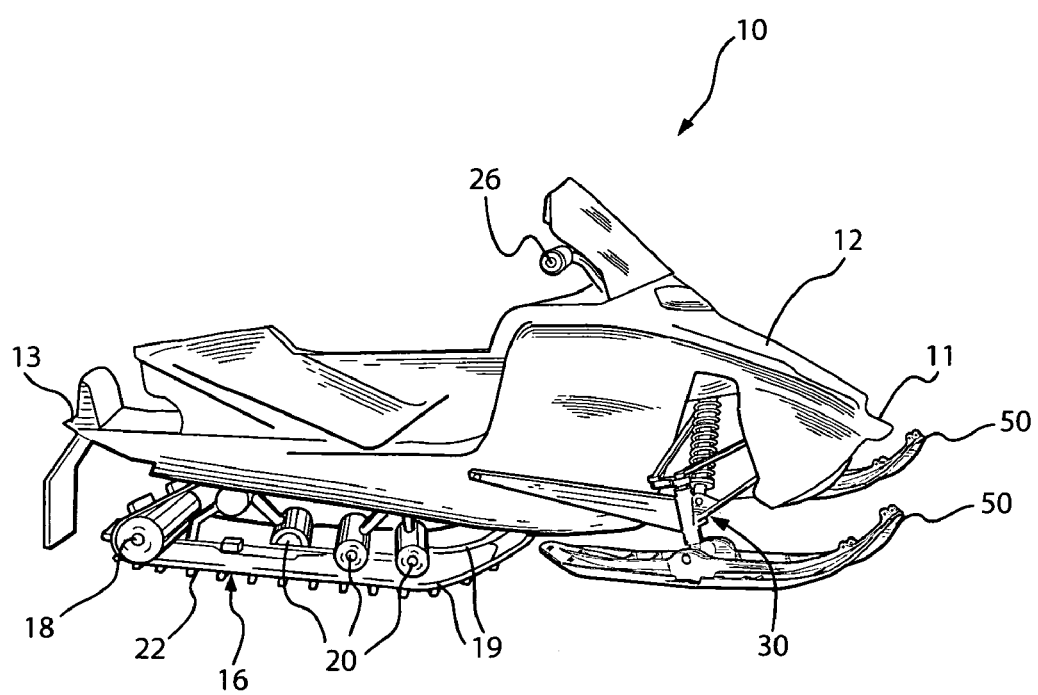
FIG. 1 shows a perspective view of a snowmobile equipped with a pair of skis according to the present invention.

FIG. 1 shows a snowmobile 10 equipped with a pair of front skis 50 according to the present invention. While the present invention will be described in the context of a snowmobile, it is understood that the ski of the present invention could be used on other vehicles, such as all terrain vehicles having at least one front ski, for example.

Snowmobile 10 defines a front end 11 and a rear end 13, and generally comprises a bodywork 12 installed on and covering a snowmobile framework (concealed under bodywork 12 in the drawings), and a combustion engine (not shown) nested within bodywork 12. Moreover, a belt-type propulsion assembly 16 is installed adjacent rear end 13, and comprises guide rails 19, which carry a sprocket roller 18 driven by an output shaft (not shown) of the snowmobile engine through a suitable belt-type transmission (not shown), as is well known in the art. Guide rails 19 also carry a number of idler rollers 20. Guide rails 19, sprocket roller 18 and idler rollers 20 cooperate to form a path around which a belt-type drive track 22 is trained, and sprocket roller 18 can be selectively driven in rotation by the snowmobile's engine to actuate drive track 22, and thus set snowmobile 10 in forward or rearward motion, as known in the art. Snowmobile 10 further comprises handlebars 26 to steer snowmobile 10.

Figure 2:
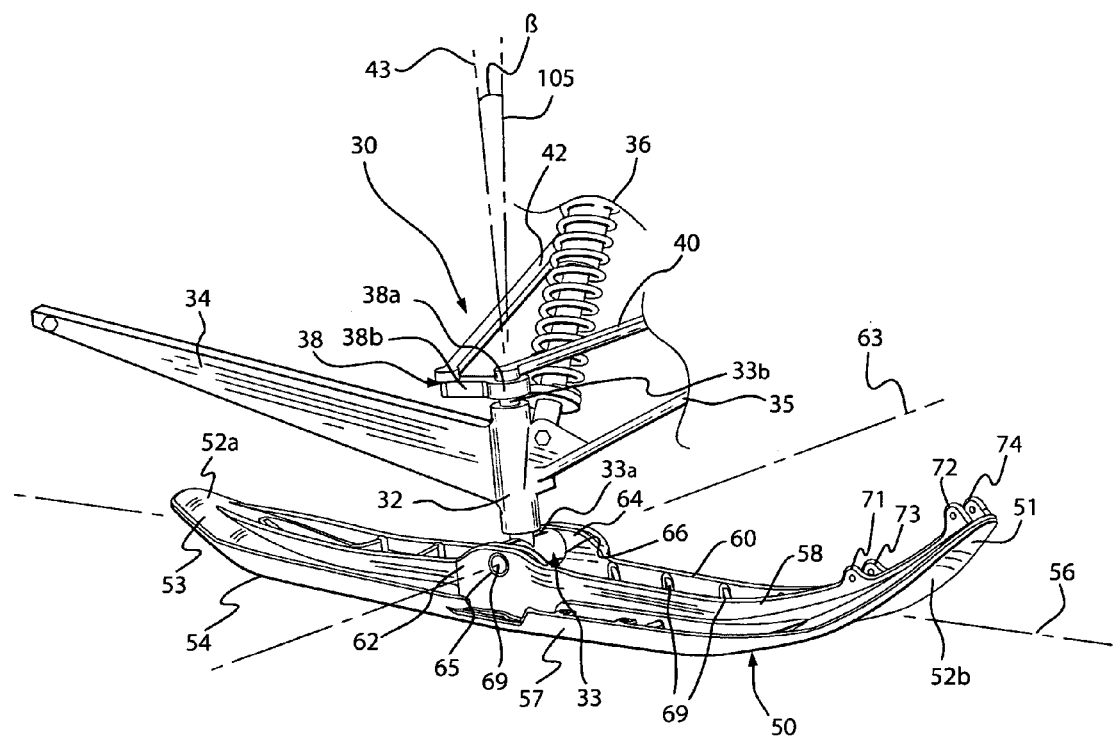
FIG. 2 shows an enlarged perspective view of a portion of the steering and suspension system of the snowmobile of FIG. 1, to which is attached a ski according to the present invention.

A pair of front skis 50, which are described in a detailed manner hereinafter, are releasably attached at the front end of snowmobile 10. Each one of skis 50 is releasably attached to a T-shaped ski attachment member 33 of a steering and suspension system 30 installed on snowmobile 10 proximate its front end 11, as shown in FIG. 2. Attachment member 33 defines a bored ski pivot portion 33a, to which ski 50 is releasably and pivotally attached in a manner described hereinafter, and a kingpin portion 33b integrally and perpendicularly attached to pivot portion 33a. Kingpin portion 33b pivotally and snugly engages a cylindrical bushing 32 of steering and suspension system 30. Attachment member 33, and thus ski 50, can thereby swivel relative to bushing 32, about a steering axis 43 coinciding with the central axis of cylindrical bushing 32. It is to be noted that bushing 32 is inclined rearwardly upwardly, and steering axis 43 therefore forms an angle β with a vertical axis 105. β can equal 15 to 20 degrees for example. This inclination of steering axis 43 will affect the steering movement of ski 50, as described hereinafter. Additionally, bushing 32 can be optionally inwardly upwardly inclined also, for example by a 1 to 5 degree angle.

Two flexible supporting arms 34 and 35 are integrally attached at one end to bushing 32; at their other end, supporting arm 34 is secured with a bolt to a registering side of snowmobile bodywork 12, and supporting arm 35 is attached to the snowmobile's framework. Moreover, bushing 32 is fixedly attached to the lower end of a spring loaded suspension strut 36 (as known in the art) of steering and suspension system 30. Suspension strut 36 can extract or retract, and acts as a shock absorber which cushions snowmobile 10 against terrain irregularities. Supporting arms 34, 35 can yieldingly and resiliently deform to allow movement of bushing 32 relative to bodywork 12. Suspension strut 36 and supporting arms 34, 35 cooperate in maintaining bushing 32 firmly, yet resiliently movably in a spaced-apart fashion relative to snowmobile bodywork 12.

Furthermore, at its end opposite ski pivot portion 33a, kingpin 33b of attachment member 33 is fixedly coupled to the pivot end 38a of a connecting rod 38. At this pivot end 38a, connecting rod 38 is pivotally attached to one end of a swivel arm 40, which is suitably attached at the other end to the framework of snowmobile 10. Furthermore, a steering link 42 is pivotally attached to a lever end 38b of connecting rod 38, steering link 42 being operatively connected to handlebars 26 through a suitable steering linkage (not shown). By manoeuvring handlebars 26, steering link 42 can be selectively moved inwardly or outwardly, thus inducing a pivotal motion of connecting rod 38, of ski attachment member 33, and thus of ski 50, about steering axis 43. Accordingly, movement of handlebars 26 results in a corresponding steering movement of front skis 50.

Any suitable alternate steering and suspension system could be provided for on snowmobile 10 instead of steering and suspension system 30 described hereinabove, without departing from the scope of the present invention.

With reference to FIGS. 2–5, the present ski 50 will now be described in greater detail. Ski 50 can be made for example in one piece from molded polyethylene plastic. Ski 50 has an elongated shape, and defines a front end portion or approach portion or front tip 51, a rear end portion or trailing portion or rear tip 53, two side walls 57, 59, and a longitudinal axis 56 extending between front end portion 51 and rear end portion 53. Ski 50 comprises a top surface 52a and a bottom surface or sole 52b; ski sole 52b defines two lateral edges 54, 55. Two elongated spaced-apart longitudinal reinforcement flanges 58, 60 project integrally and upwardly from top surface 52a of ski 50, and run longitudinally along ski 50, spacedly from lateral walls 54, 55. A plurality of additional transverse reinforcement ribs 69, projecting integrally and upwardly from ski body top surface 52, integrally extend between reinforcement flanges 58, 60.

Flanges 58, 60 comprise two integral attachment lips 62, 64 projecting upwardly from a central section thereof. Two pivot holes 65, 66 are bored transversely across attachment lips 62, 64, and a pivot pin 69 extends through holes 65, 66 and through pivot portion 33a of attachment member 33. Accordingly, ski 50 can be pivoted or tilted relative to snowmobile 10 about a transversal axis 63 extending coaxially through pivot holes 65, 66 and preferably perpendicular to longitudinal axis 56. In addition, reinforcement flanges 58 and 60 comprise nibs 71, 73 and 72, 74, respectively, projecting integrally upwardly thereof at the vicinity of approach portion 51. In the embodiment shown in FIG. 6, a tensioning rod 70 bent in the form of a J, as known in the art, can be attached to ski 50 at one end to nibs 71 and 72 and at the other end to nibs 73 and 74 (FIG. 5).

Figure 3:
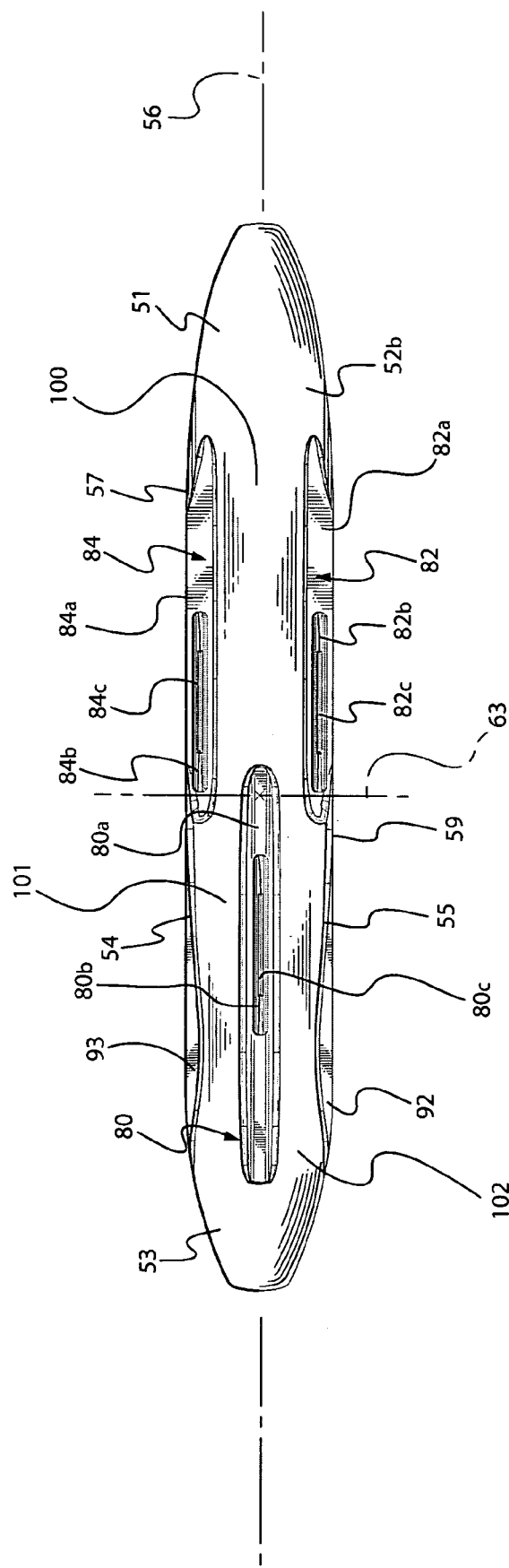
FIG. 3 is a bottom plan view of the ski of the present invention.
Figure 4:
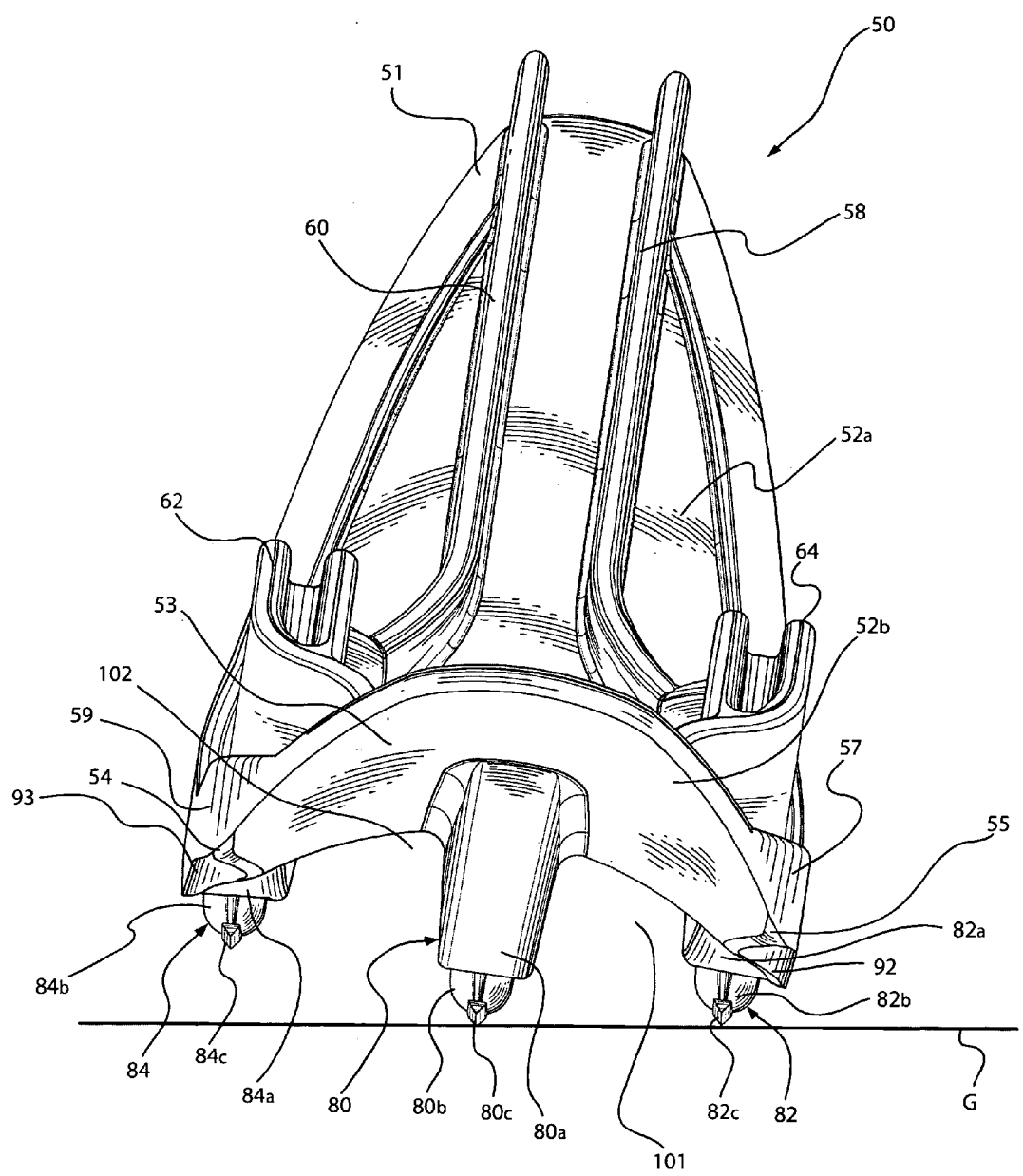
FIG. 4 is an enlarged rear elevation view of the ski of the present invention, the ski being in an inclined turn-carving position.
Figure 5:
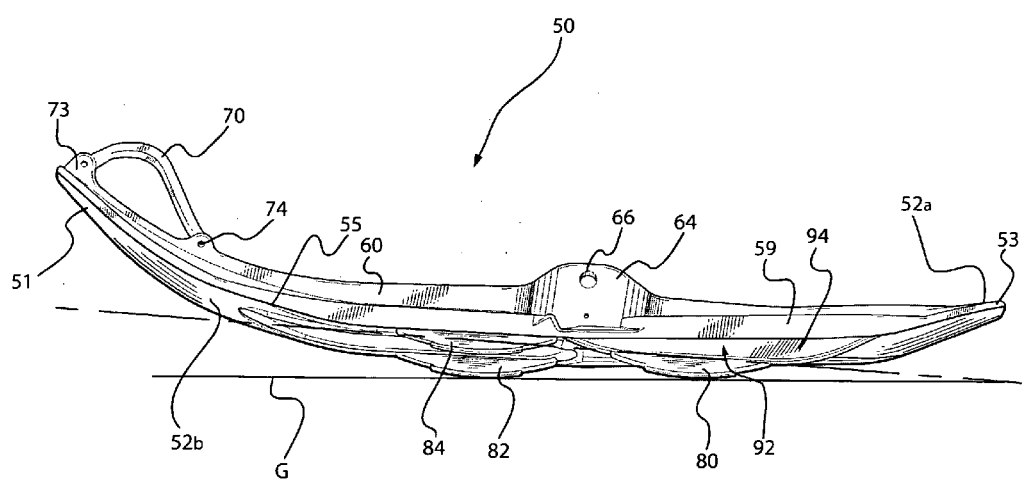
FIG. 5 is a side elevation view of the ski when the latter is in an inclined turn-carving position.
Figure 6:
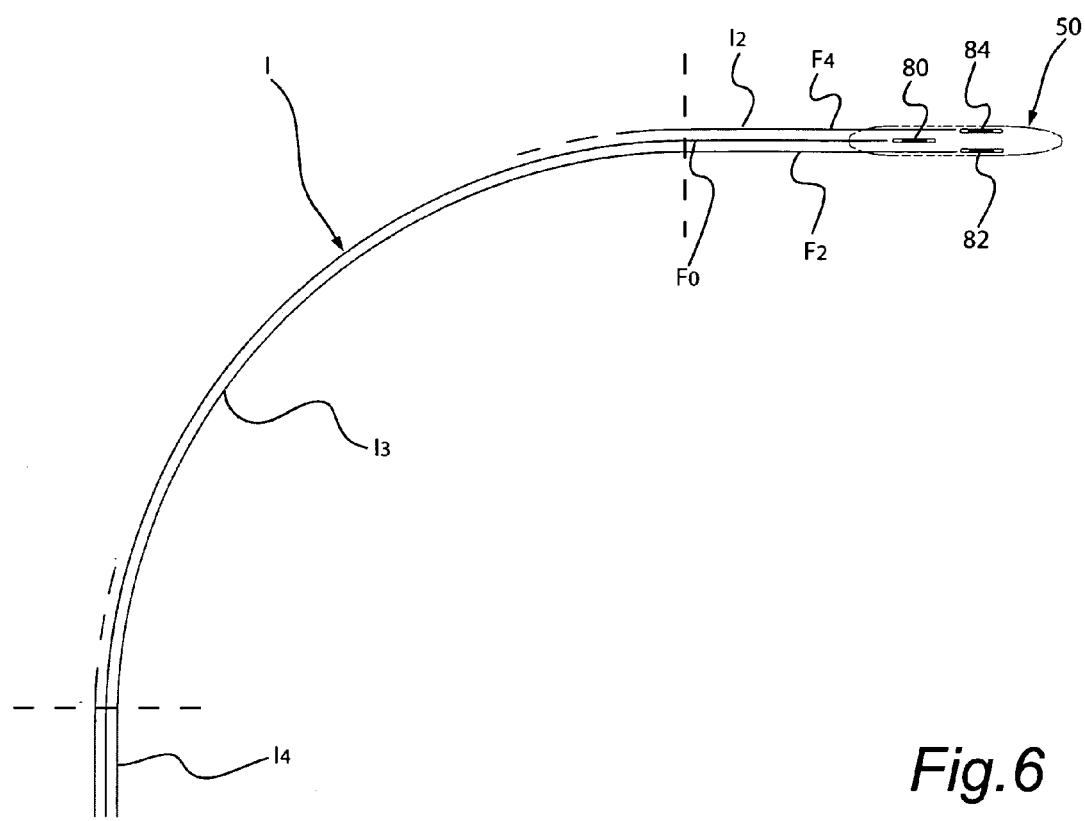
FIG. 6 is a schematic view of the imprint left on the snow after the ski has made a turn.

As illustrated in FIGS. 3–5, three elongated longitudinally-oriented keels 80, 82 and 84 project downwardly from ski sole 52b. More particularly, ski 50 is provided with two front lateral keels 82, 84 symmetrically located on one side and the other of longitudinal axis 56 adjacent ski lateral edges 54, 55, and frontwardly of transversal axis 63. Ski 50 is further provided with a central rear keel 80 centrally located between ski lateral edges 54, 55 and longitudinally offset rearwardly relative to front keels 82, 84, in a longitudinal position located rearwardly of transversal axis 63. Rear central keel 80 and front lateral keels 82, 84 thus form an asymmetric keel arrangement with respect to the ski transversal axis 63. This is contrary to conventional keel configurations on prior art snowmobiles, wherein a single one or a pair of keels are provided that are arranged substantially symmetrically with respect to both the longitudinal and transversal axes of the ski, i.e. the keels extend substantially symmetrically on one side and the other of the transversal axis of the ski.

Each one of keels 80, 82, 84 is three-tiered, in that it comprises:

1) an elongated base portion 80*a*, 82*a*, 84*a*, which projects downwardly and integrally from ski sole 52*b*;
2) an elongated bulgy runner mount 80*b*, 82*b*, 84*b*, projecting downwardly and integrally from base portion 80*a*, 82*a*, 84*a*, and being shorter than base portion 80*a*, 82*a*, 84*a*;
3) a runner 80*c*, 82*c*, 84*c*, press-fitted in a groove made centrally and longitudinally on runner mounts 80*b*, 82*b*, 84*b*. Each runner 80*c*, 82*c*, 84*c* is made of a hard, cross-sectional triangular strip of carbide steel, and increases the bite of ski 50 in an underlying snowy surface, and especially in icy patches formed thereon. In one embodiment of the invention, these carbide runners 80*c*, 82*c*, 84*c* are releasable from runner mounts 80*b*, 82*b*, 84*b*, in order to be readily replaced. Indeed, runners 80*c*, 82*c*, 84*c* are the portion of the keels which will sink the most in the snowy ground, and are thus prone to being worn by grinding against ice, rocks, tree roots, and other hard obstacles which can be found on the snowmobile's path.

When snowmobile 10 moves in a straight line over the ground G, ski 50 will engage the ground substantially flatly. The lowermost edges of keels 80, 82, 84, namely the sharp free edges of runners 80*c*, 82*c*, 84*c*, will define a plane of reference that will generally coincide with the ground when snowmobile 10 travels over flat ground in such a straight line. Of course, this plane of reference will rarely precisely coincide with the ground for a long time since the ski will pivot about transversal axis 63 to compensate irregularities in the ground surface, but if the ground is substantially flat, it can be said that the plane of reference will generally coincide with the ground when snowmobile 10 moves in a straight line. As noted hereinabove, since bushing 32 is oriented rearwardly, this plane of reference will not be perpendicular to steering axis 43, but rather inclined relative thereto, for example of 15 to 20 degrees.

It is to be noted that the width of ski sole 52*b*, defined by the distance between lateral edges 54 and 55, varies with its length. The approach portion 51 is gradually narrowed down towards the frontmost tip of ski body 52, and trailing portion 53 is gradually narrowed down towards the rearmost tip of ski body 52.

Moreover, rear depressions 92, 93 are made in ski sole 52*b*. These depressions 92, 93 will provide accommodation for the ground when snowmobile 10 is making a turn, as described hereinafter. Depressions 92, 93, in the embodiment illustrated in the figures, are formed by outwardly and upwardly inclined surfaces, and are also characterized by a narrowing constriction in ski sole 52 which is defined by a decrease of the distance between lateral edges 54 and 55 in these depressions, and by an increase of the distance between the ski sole 52*b* and ground reference plane G in these depressions. Depressions 92, 93 are located longitudinally near rear keel 80, slightly rearwardly of the central point thereof. Alternately, the ski could have a continuously decreasing width or a continuously upwardly inclined ski sole 52*b* rearwardly of transversal axis 63.

In one alternate embodiment of the invention, the depressions will be represented by a pair of rear inclined surfaces that extend from transversal axis to the rear tip 53 of ski 50. These inclined surfaces will form a V-shape with a central edge extending longitudinally from transversal axis 63 to rear tip 53, substantially co-extensively with the ski sole 52*b* located frontwardly of transversal axis 63. The two inclined surfaces forming the depressions would be inclined outwardly upwardly from their common central edge. Moreover, the inclination of these rear inclined surfaces could gradually increase from central axis 63 to rear tip 53.

The purpose of depressions 92, 93 will be described hereinafter in greater detail.

In addition, it can be observed in FIGS. 3–4 that ski sole 52*b* of ski 50 is concave. This concave geometry provides ski 50 with snow channels 100, 101, 102. As seen in FIG. 3, the single front snow channel 100 formed between front keels 82, 84 is forked into two rear side channels 101, 102 formed between rear keel 80 and ski sole lateral edges 54, 55. If and when snowmobile 10 is in motion on a snowy ground surface that is covered with layer of free granular fluffy snow (as opposed to a hard compacted snow trail, for example), the free snow underlying ski 50 will be channelled through channel 100, and then forked in channels 101 and 102. This channelling of the free snow within channels 100, 101, 102 will promote stable engagement of ski 50 in abundant fluffy snow conditions.

In use, ski 50 will support the snowmobile over ground and will slide on the ground as the snowmobile moves forward. Ski 50 will also allow snowmobile 10 to be steered in a desired direction though the instrumentality of handlebars 26. The relative arrangement of keels 80, 82, 84 and of depressions 92, 93 is such that new and advantageous self-steering capabilities are imparted to ski 50, which will now be described.

As ski 50 slides along a hard compacted snowy ground surface or over ice (as opposed to a ground surface covered with free fluffy snow), it will generally flatly engage the ground while snowmobile 10 moves along a straight line, with the ski resting on runners 80*c*, 82*c*, 84*c*. In such a position, the ski reference plane G that extends along all the runner free edges generally coincides with the ground surface as noted hereinabove.

When snowmobile 10 is steered to accomplish a turn, handlebars 26 are pivoted to impart a pivoting motion in ski 50 about its steering axis 43 extending through bushing 32, to move ski front tip 51 in the direction in which it is desired to direct the snowmobile. Since steering axis 43 is inclined upwardly rearwardly and also optionally upwardly inwardly, this pivotal displacement of ski 50 about steering axis 43 will bias ski 50 towards a plane of rotation perpendicular to steering axis 43 and which is consequently inclined relative to the plane of reference of ski 50 and to the ground. Due to the pivotal attachment of ski 50 to the snowmobile by means of the transverse pivot pin 69 and attachment member 33 assembly that allows a free pivotal movement of ski 50 about its transversal axis 63, the pivotal displacement of ski 50 about its steering axis 43 will result in ski 50 remaining in continuous substantially flat engagement on the ground surface, but will provoke a lateral tilting or lateral pivotal displacement of the ski about its longitudinal axis 56 (FIGS. 4 and 5). Ski 50 will consequently reach a turn-carving position shown in FIGS. 4 and 5, in which it comes to rest on two of the three keels 80, 82, 84 only, namely the rear central keel 80 and the lateral keel 82 or 84 closest to the direction in which the turn is being accomplished, for example lateral keel 82 as shown in FIGS. 4 and 5. Since rear keel 80 is offset inwardly along the ski transversal axis relative to the other supporting lateral keel 82, ski 50 will also very slightly pivot relative to its transversal axis to adopt a position in which its front tip 51 is slightly uplifted (FIG. 5) relative to the straight line position of ski 50 in which it flatly rests on its three keels 80, 82, 84.

It is understood that the more ski 50 is forced in a pivotal displacement about its steering axis 43 to force snowmobile 10 into a sharper turn, the more ski 50 will be tilted laterally and frontwardly upwardly.

This tilted position of ski 50 will allow ski 50 to maintain an engagement with the ground with two keels 80 and 82, which is advantageous compared to a single keel engagement in that it increases the bite of the ski considerably on the ice or hard compacted snow surface, therefore providing ski 50 with an enhanced gripping effect, all the while providing the tilted position to ski 50 which is advantageous during turning operations.

Also, the engagement of the two keels 80, 82 that rest on the ground when ski 50 is turning, provides a self-steering capacity to ski 50. Indeed, since the central rear keel 80 is asymmetrically disposed on the ski sole 52b relative to the lateral front keel 82 with respect to both the longitudinal and transversal axes, the frontward pressure applied by the frontwardly propelled snowmobile will result in the ski naturally being biased into a circular path that is illustrated schematically in FIG. 6. In this figure, it can be seen that the imprint I made in the snow by keels 80, 82, and 84 can be decomposed in three portions: portions $I_1$ and $I_2$, corresponding to the imprint ski 50 leave in the snow when snowmobile 10 is moving in a straight line, and a portion $I_3$ corresponding to the imprint ski 50 leaves in the snow when it is making a turn. Imprint I is composed of three furrows $F_0$, $F_2$, $F_4$ corresponding to the imprint the keels 80, 82, 84 respectively dig in the snow. As can be inferred from the observation of imprints $I_1$ and $I_2$, all three keels 80, 82, 84 engage the ground and dig furrows $F_0$, $F_2$, $F_4$ therein when ski 50 is moving in a straight line since ski 50 flatly engages the ground and the ski reference plane is substantially coplanar with the ground. However, when snowmobile 10 turns, as can be inferred from observing imprint $I_3$ made in the snow after the ski has made a left turn, only two keels 80, 82 dig furrows $F_0$, $F_2$ in the snow.

The rear ground clearance of ski 50 is important since the ski rear tip 53 will pivot downwardly as the ski turns, as shown in FIG. 5. The purpose of the rear ground clearance, defined as the space between the ski reference plane and the ski sole 52b rearwardly of transversal axis 63, is accordingly to prevent the ski sole 52b from accidentally engaging the hard ground surface when ski 50 is carving the ground with only two of its keels 80, 82 during a turn. Indeed, if the smooth ski sole were to engage the ground, it would remove weight from the carving keels 80, 82 and the ski would lose its grip and allow the snowmobile to start skidding transversely and break its turning line, with possible dire consequences to the driver if a high speed accident ensues. Consequently, the portion of ski 50 which is located rearwardly of its transversal axis must clear the ground sufficiently to prevent accidental ground engagement of the ski sole against the ground when the ski is in its inclined turn-carving position.

Since the rear ski portion 53 tilts both laterally and downwardly in the turn-carving position of the ski as shown in FIGS. 4 and 5, depressions 92, 93 are provided both near the rear end 53 of ski 50 and near the ski sides 57, 59 to prevent the ski rear side edge portions from accidentally engaging the ground. Depressions 92, 93 are consequently located at areas where the ground clearance of the ski sole 52b is not as important as elsewhere, to help prevent the ski sole from accidentally engaging the ground. Were it not for the fact that ski rear tip 53 is inclined upwardly, depressions 92, 93 would extend rearwardly up to the extremity of rear end portion 53; however, the particular ski geometry shown in the annexed drawings provides for a natural depression at the ski rear end due to the upward inclination of ski rear tip 53, and therefore the actual resulting ski depressions are formed by the combination of depressions 92, 93 and by the upwardly inclined bottom surface of the ski at its rear end portion 53. However, the depressions 92, 93 per se are located on either side of central rear keel 80 and extend short of ski rear tip 53.

It is understood that ski 50 will react in a similar manner when turning in the opposite direction, ski 50 then resting on its other lateral keel 84 instead of keel 82.

The above-described turn-carving position of ski 50 is particularly advantageous when ski 50 engages a hard surface such as compacted snow or ice. Indeed, in the case where ski 50 engages a free fluffy and abundant snow surface, then the biting effect of keels 80, 82, 84 will be lessened. In such fluffy snow conditions, the snow will be channelled through snow channels 100, 101, 102, from the front end to the rear end of ski sole 52b and this snow channelling, in combination with the action of the ski side walls 57, 59 against the snow, will allow the snowmobile to be efficiently steered. Thus, the particular keel arrangement of the present invention, although it allows the ski to have an advantageous channel arrangement, is especially advantageous on hard ground surfaces, such as compacted snow or ice, where keels 80, 82, 84 may have an optimum engagement against the hard ground surface for increased gripping effect.

During the experimental and test phase of the present invention, different keel arrangements and ski geometries were experimented. Unexpectedly, it has been noticed that by fashioning a ski having registering keels 82, 84 located in the rearmost half of the ski rather than in its frontmost half, and concurrently having a central keel 80 and depressions or ground clearances 92, 93 located in the frontmost half of the ski rather than in the rearmost half, ski 50 exhibits a similar self-steering and advantageous behavior. Accordingly, provision could be made for a ski having such an inverted arrangement of the keels and of the lateral depressions, without departing from the scope of the present invention. In fact, a plurality of keel arrangements could be envisioned, wherein the central keel would be longitudinally offset relative to the lateral keels, and wherein the ground clearance would be located in the vicinity of the central keel, for example rearwardly of the transversal axis if the central keel is located rearwardly thereof and the lateral keels are located frontwardly thereof, or frontwardly of the transversal axis if the central keel is located frontwardly thereof and the lateral keels are located rearwardly thereof.

It is understood that additional keels could be installed on the ski in addition to the two lateral keels and the central keel.

What is claimed is:

1. An elongated vehicle snow ski for attachment to a snow vehicle steering mechanism, said ski comprising:

opposite top and bottom surfaces;

opposite first and second sides; opposite front and rear ends, said ski defining a longitudinal axis extending between said front and rear ends;

a pivot joint member attached to said top surface for pivotally attaching the ski to the steering mechanism for allowing pivotal displacement of said ski about a transversal axis extending between said first and second sides and intersecting said longitudinal axis, said ski further being pivotable about a steering axis that extends transversely to and that intersects said longitudinal and transversal axes;

a pair of spaced-apart, elongated, longitudinally-oriented lateral keels integrally projecting from said bottom surface;

an elongated longitudinally-oriented central keel integrally projecting from said bottom surface, said central keel being longitudinally offset relative to said lateral keels and being located between said pair of lateral keels along said transversal axis; and a pair of elongate depressions positioned along opposite outside edges of said bottom surface on either side of said central keel;

wherein said ski is movable between a straight line position in which a ground plane that intersects a lowermost surface of said lateral and central keels is defined, and a turn-carving position in which said ski is pivoted about its steering, longitudinal and transversal axes relative to said straight line position and is inclined laterally so that only said central keel and a single one of said pair of lateral keels intersect said ground plane and the other one of said lateral keels is raised above said ground plane, said depressions defining a ground clearance in the vicinity of said central keel allowing said ski bottom surface to remain spaced from said ground plane in said turn-carving position of said ski.

2. A vehicle snow ski as defined in claim 1, wherein said lateral keels are located intermediate said transversal axis and said ski front end and said central keel is located intermediate said transversal axis and said ski rear end.

3. A vehicle snow ski as defined in claim 1, wherein said ski bottom surface is generally concave and defines a first snow channel between said pair of lateral keels, said first snow channel forking into a second snow channel between said central keel and said first side and a third snow channel between said central keel and said second side, said first, second and third snow channels being destined to channel snow therein during sliding engagement of said ski over a snow-covered terrain.

4. A vehicle snow ski as defined in claim 1, wherein said pair of depressions are located longitudinally adjacent said central keel.

5. A vehicle snow ski as defined in claim 1, wherein said depressions comprise a rearwardly upward inclination of said ski bottom surface.

6. A snow vehicle destined to move over an underlying ground surface, comprising a main body, drive means carried by said main body and destined to set said snow vehicle in motion over the ground surface, a selectively controllable steering system carried by said main body comprising a steering pivot member pivotable about a steering axis, and an elongated snow ski pivotally attached to said steering axis of said steering system, said snow ski comprising:

opposite top and bottom surfaces;

opposite first and second sides; opposite front and rear ends, said ski defining a longitudinal axis extending between said front and rear ends;

a transverse pivot joint member attached to said top surface and pivotally connected to said steering pivot member of said steering system, said transverse pivot joint member allowing pivotal displacement of said ski about a transversal axis extending between said first and second sides and extending transversely to and intersecting said longitudinal and steering axes;

a pair of spaced-apart, elongated, longitudinally-oriented lateral keels integrally projecting from said bottom surface;

an elongated, longitudinally-oriented central keel integrally projecting from said bottom surface, said central keel being longitudinally offset relative to said lateral keels and being located between said pair of lateral keels along said transversal axis; and a pair of elongate depressions positioned alone opposite outside edges of said bottom surface on either side of said central keel;

wherein said ski is movable between a straight line position in which a ground plane that intersects a lowermost surface of said lateral and central keels is defined, with said steering axis forming an acute angle relative to said ground plane, and a turn-carving position in which said ski is pivoted about its steering, longitudinal and transversal axes relative to said straight line position and is inclined laterally so that only said central keel and a single one of said pair of lateral keels intersect said ground plane and the other one of said lateral keels is raised above said ground plane, said depressions defining a ground clearance in the vicinity of said central keel allowing said ski bottom surface to remain spaced from said ground plane in said turn-carving position of said ski.

7. A snow vehicle as defined in claim 6, wherein said lateral keels are located intermediate said transversal axis and said ski front end and said central keel is located intermediate said transversal axis and said ski rear end.

8. A snow vehicle as defined in claim 6, wherein said ski bottom surface is generally concave and defines a first snow channel between said pair of lateral keels, said first snow channel forking into a second snow channel between said central keel and said first side and a third snow channel between said central keel and said second side, said first, second and third snow channels being destined to channel snow therein during sliding engagement of said ski over a snow-covered terrain.

9. A snow vehicle as defined in claim 6, wherein said pair of depressions are located longitudinally adjacent said central keel.

10. A snow vehicle as defined in claim 9, wherein said ski further comprises an additional depression in the form of a rearwardly upward inclination of said ski bottom surface near said ski rear end.

11. A snow vehicle as defined in claim 6, wherein said steering system comprises a second steering pivot member pivotable about a second steering axis in addition to the first-named said steering pivot member pivotable about the first-named steering axis, and a second elongated snow ski pivotally attached to said second steering axis in addition to said first-named snow ski being attached to said first-named steering axis, said first-named and second snow skis forming a pair of snow skis located on one side and the other of said snow vehicle and pivotally attached to said steering system for interdependent pivotal displacement of said snow-skis, said second snow ski comprising:

opposite top and bottom surfaces;

opposite first and second sides;

opposite front and rear ends, said ski defining a longitudinal axis extending between said front and rear ends;

a transverse pivot joint member attached to said top surface and pivotally connected to said second steering pivot member of said steering system, said transverse pivot joint member allowing pivotal displacement of said second snow ski about a transversal axis extending between said first and second sides and extending transversely to and intersecting said longitudinal axle and said second steering axis;

a pair of spaced-apart, elongated, longitudinally-oriented lateral keels integrally projecting from said bottom surface;

an elongated, longitudinally-oriented central keel integrally projecting from said bottom surface, said central keel being longitudinally offset relative to said lateral keels and being located between said pair of lateral keels along said transversal axis; and a pair of elongate depressions positioned along opposite outside edges of said bottom surface on either side of said central keel;

wherein said second snow ski is movable between a straight line position in which a ground plane that intersects a lowermost surface of said lateral and central keels is defined, and a turn-carving position in which said second snow ski is pivoted about said second snow ski steering, longitudinal and transversal axes relative to said straight line position and is inclined laterally so that only said central keel and a single one of said pair of lateral keels intersect said ground plane and the other one of said lateral keels is raised above said ground plane, said depressions defining a ground clearance in the vicinity of said central keel allowing said ski bottom surface to remain spaced from said ground plane in said turn-carving position of said ski.

12. A snow vehicle as defined in claim 11, wherein said first-named and second steering pivot members are inclined rearwardly upwardly from said transverse pivot joint members of said first named ski and said second ski, respectively, towards said snow vehicle main body.

13. A snow vehicle as defined in claim 12, wherein said first-named and second steering pivot members are further inclined inwardly upwardly from said transverse pivot joint members of said first-named ski and said second ski, respectively, towards said snow vehicle main body.

14. An elongated snow ski for use on a snow vehicle and destined to glide on and carve a ground surface, said ski being able to take a straight-moving position and a turn-carving position, said ski comprising:

opposite front and rear ends;

a ski sole having two lateral edges extending between said front and rear ends;

a longitudinal axis extending between said front and rear ends, and a transverse axis extending transversely across said lateral edges, perpendicularly to said longitudinal axis;

first, second and third elongated keels fixedly projecting from said ski sole, said first and second keels being in facing register with each other, and off-centered on said ski sole with respect to said transverse axis, said third keel being intermediate to said first and second keels with respect to said transversal axis, and said third keel being substantially longitudinally offset relative to said first and second keels with reference to said longitudinal axis; and a pair of elongate depressions positioned along opposite outside edges of said ski sole on either side of said third keel;

wherein said first, second and third keels are destined to carve the ground surface when said ski is in said straight-moving position, and wherein, when said ski is driven and is set in said turn-carving position, only a selected one of said first and second keels and said third keel are destined to carve the ground surface in order for said ski to exhibit a self-steering behavior.

15. A snow ski according to claim 14, wherein said depressions form a constriction in said ski sole.

* * * * *